United States Patent [19]
Schönrock

[11] Patent Number: 5,265,558
[45] Date of Patent: Nov. 30, 1993

[54] FOAM BED FOR DOMESTIC ANIMALS HAVING INTEGRALLY FORMED, LIQUID IMPERMEABLE OUTER SKIN

[76] Inventor: Thomas Schönrock, 1324 SE. 12th Way, Fort Lauderdale, Fla. 33316

[21] Appl. No.: 884,802

[22] Filed: May 19, 1992

[51] Int. Cl.[5] ............................................. A01K 1/03
[52] U.S. Cl. .................... 119/28.5; 5/473; 264/45.6
[58] Field of Search ............... 119/28.5, 19; 5/473, 5/420, 603, 636, 637, 481, 655, 656; 264/45.5, 45.6

[56] References Cited

U.S. PATENT DOCUMENTS

| | | | |
|---|---|---|---|
| D. 221,558 | 8/1971 | Zimmermann | D30/6 |
| D. 259,274 | 5/1981 | Humes | |
| D. 259,458 | 6/1981 | Fuller et al. | |
| 1,569,710 | 1/1926 | Burt | 119/28.5 |
| 3,066,646 | 6/1959 | Bramley | |
| 3,161,436 | 12/1964 | Hood | |
| 3,449,477 | 6/1969 | Logomasini | 264/45.6 |
| 3,476,841 | 11/1969 | Bienert | 264/45.6 |
| 3,595,734 | 7/1971 | Krug | 264/45.6 |
| 3,803,274 | 4/1974 | Nakashima et al. | 264/45.6 |
| 3,846,526 | 11/1974 | Wade | 264/45.5 |
| 4,701,473 | 10/1987 | Hasegawa et al. | 264/45.6 |
| 4,704,130 | 11/1987 | Gilding et al. | 264/45.6 |
| 4,712,258 | 12/1987 | Eves | 5/420 |
| 4,980,937 | 1/1991 | Mason et al. | 5/481 |

FOREIGN PATENT DOCUMENTS

| | | | |
|---|---|---|---|
| 2543914 | 4/1977 | Fed. Rep. of Germany | 119/28.5 |
| 2514990 | 4/1983 | France | 119/28.5 |
| 2016890 | 9/1979 | United Kingdom | 119/28.5 |
| 2211387 | 7/1989 | United Kingdom | 119/28.5 |

OTHER PUBLICATIONS

3 Flexi-Mat Brochures, Cuddler ™ and Kitty Cup ™ brochures, 1990.

*Primary Examiner*—John J. Wilson
*Assistant Examiner*—Todd E. Manahan
*Attorney, Agent, or Firm*—Werner H. Stemer

[57] ABSTRACT

An improved method of manufacturing a basic structure for an animal bed and the article of manufacture resulting from the process are disclosed. The bed structure has a bottom wall and side walls. Chemical components for a foamable polyurethane base are mixed. Then the foamable base is placed in a mould which has the shape of the animal bed. The foam is cured for forming a one-piece integral foam bed structure which has a liquid-impermeable closed pore skin formed thereon. Then the structure is removed from the mould and may be covered with any desired fabric.

6 Claims, 2 Drawing Sheets

FOAM BED FOR DOMESTIC ANIMALS HAVING INTEGRALLY FORMED, LIQUID IMPERMEABLE OUTER SKIN

BACKGROUND OF THE INVENTION

1. Field of the Invention

The invention relates to a bed for domestic animals, and particularly to beds for dogs and cats.

2. Description of the Related Art

The most pertinent prior art of which this inventor is aware are pet beds distributed by the Flexi-Mat Corporation. In those animal beds, available for example in the CUDDLER and KITTY KUP series, a basic foam rubber structure is covered with different fabrics, such as denim, corded or fleece-imitation fabrics.

The basic structure of the Flexi-Mat beds and that of other prior art beds is formed of a flat foam bottom onto which a sidewall is glued. As far as understood, the oval bottom is cut out from a sheet of foam and then the side wall, which is also cut from the foam, is glued to the bottom, approximately at a 90° angle.

The afore-described prior art beds are formed of open-pore foam rubber and are thus not impermeable to fluids. In fact, they have been found to soak up and retain body fluids which the animals naturally excrete. In other words, the bed structure must be washed repeatedly or simply disposed of. Repeated washing, of course, leads to increased stress on the connecting seams. Besides being rather labor intensive to produce—the parts must be cut and then glued together—the prior art beds have been found to relatively easily come apart at the connecting seams.

A similarly shaped animal bed is known from U.S. Pat. No. Des. 221,558 to Zimmerman. That disclosure is silent with regard to materials, method of manufacture and rigidity of the pet bed.

Also of interest in the context of the instant application is U.S. Pat. No. 3,066,646 to Bramley. A two-part structure is disclosed, namely a foamed plastic body covered with a water-proof material envelope. As described in the patent, the method of manufacture is quite complicated and labor-intensive.

Finally with respect to prior art teachings, the molded foam cushion disclosed in U.S. Pat. No. 3,161,436 to Hood is of interest in this context. The cushion is manufactured in many process steps and has a very complicated structure.

It is accordingly an object of the invention to provide a bed for domestic animals, which overcomes the hereinafore-mentioned disadvantages of the heretofore-known devices of this general type and which is impermeable to fluids, which is easy to manufacture and which does not have any connecting seems which are prone to disintegrating. As a final point, the prior art animal beds cannot be easily stacked in storage or on the shelves, since the walls are formed on the bottom at a 90° angle.

SUMMARY OF THE INVENTION

With the foregoing and other objects in view there is provided, in accordance with the invention, an improvement in a method for manufacturing a domestic animal bed which comprises:

a) mixing chemical components for forming a foamable base; the preferred chemical components are isocyanate and polyol. Other curable plastics are also possible.

b) placing the foamable base in a mould having the shape of the animal bed;

c) curing the foam for forming a one-piece integral foam bed structure having a liquid impermeable closed pore skin formed thereon; and d) removing the basic structure from the mould.

Subsequently, the basic structure may be covered with any cover fabric according to personal preferences.

In accordance with another mode of the invention, the basic structure is covered with a cover fabric after the removing step.

With the objects of the invention in view, there is further provided, in accordance with the invention, a bed for domestic animals, comprising a foamed polyurethane basic structure formed in a single mould, the basic structure having a bottom wall and side walls integrally formed on the bottom wall, the side walls defining an obtuse angle with the bottom wall, and the walls having a closed-cell liquid-impermeable skin formed thereon at least on inside surfaces of the base structure.

As mentioned above, the obtuse angle between the bottom and side walls allows for easy and space-saving stacking of the animal bed. Furthermore, the fabric cover will adapt very closely to the basic structure.

In accordance with an added feature of the invention, the basic structure has exposed surfaces and the liquid-impermeable skin is formed on all of the exposed surfaces of the basic structure.

In accordance with a further feature of the invention, a fabric cover is removably attached to the basic structure for covering the basic structure.

In accordance with a concomitant feature of the invention, the obtuse angle lies in a range between 120° and 100° and is preferably approximately 110°.

Other features which are considered as characteristic for the invention are set forth in the appended claims.

Although the invention is illustrated and described herein as embodied in a bed for domestic animals, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
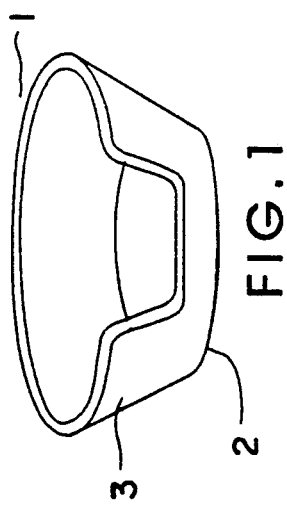
FIG. 1 is a front-perspective view of the animal bed according to the invention.
Figure 3:
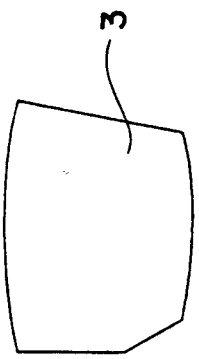
FIG. 3 is a right-side elevational view of the animal bed.
Figure 5:
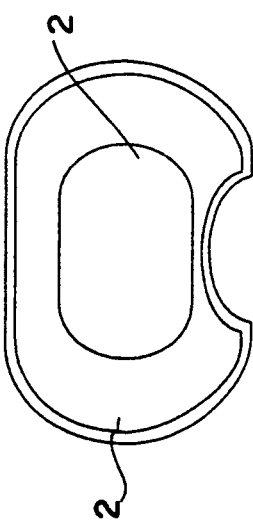
FIG. 5 is a top-plan view of the animal bed.

Referring now to the figures of the drawing in detail and first, particularly, to FIG. 1 thereof, there is seen a basic structure 1 of a bed for domestic animals. The basic structure 1 is covered with a non-illustrated removable cover, which may be any type fabric, according to customer preferences or fashion trends. As mentioned in the description of the prior art, it has been known to cover the basic structure 1 with fleece imitation, cord-type fabrics or denim. Other fabrics are equally possible and may be chosen freely.

The basic structure 1 includes a bottom wall 2 which is approximately oval. Side walls 3 are integrally formed on the bottom wall 2, making therewith an angle $\alpha$ of approximately 110°. In other words, the side walls 3 diverge with respect to the respectively opposite side wall 3 at an angle of approximately 40°. Again alternatively, one may say that the side walls 3 form an angle $\beta$ with the outlying floor of approximately 70°. While variations of 10° to 20° would clearly lie in the range of equivalents, it has been found that the presently preferred range of angle variations is not more than about 5°.

Figure 2:
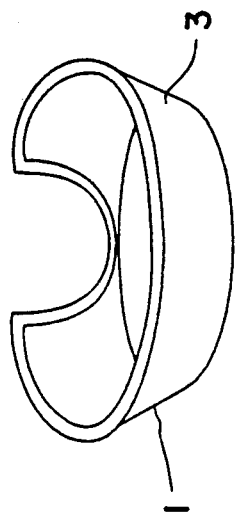
FIG. 2 is a rear-perspective view of the bed of FIG. 1.
Figure 4:
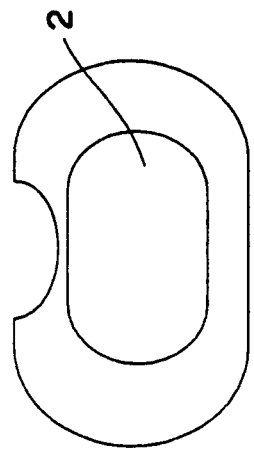
FIG. 4 is bottom-plan view of the animal bed.
Figure 6:
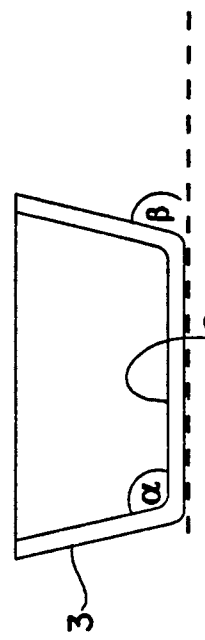
FIG. 6 is a cross-sectional view of the animal bed along the line VI—VI of FIG. 5, as viewed in the direction of the arrows.

As seen in FIG. 6, the transition from the bottom wall 2 to the side walls 3 is smoothly rounded. Firstly, the non-illustrated cover will snugly fit the basic structure 1. Secondly, the transition is reinforced at the very location where it is most prone to breaking.

The basic structure 1 is formed as a single-piece structure formed in a mould. The mould may be made of any material which lies within the skill of the artisan. This inventor has used fiberglass moulds with an epoxy lining. In any case, a smooth surface of the mould is important, so as to provide a smooth and liquid-impermeable "skin" on the finished product.

Various foamable materials are well suited. As desired, one may use rigid foam or flexible foam. Accordingly, many different types of chemicals may be used in the process. The essence of this invention and the improvement over the prior art lies in the fact that the animal bed is produced in a mould and as an integral structure. The advantage of integral connections between the side walls and the bottom wall over the prior art seams is apparent.

Figure 7:
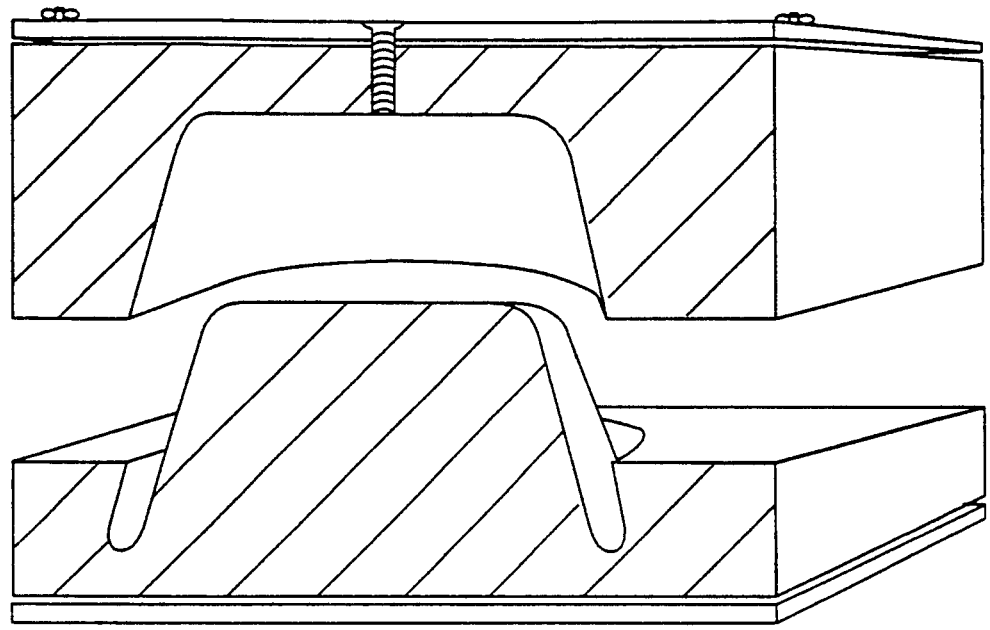
FIG. 7 is a diagrammatic view of the mould in which the animal bed is produced.
Figure 8:
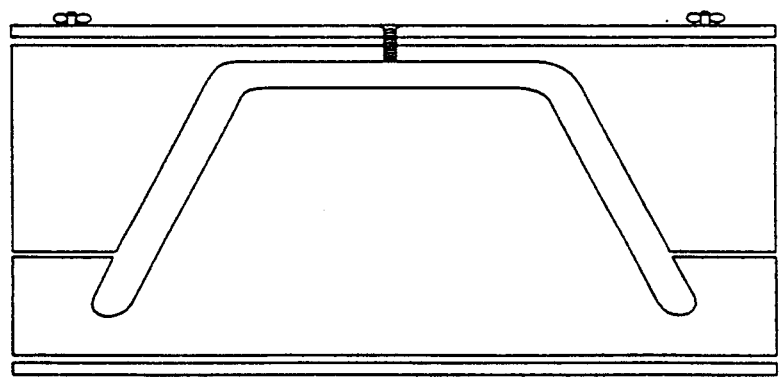
FIG. 8 is a cross-sectional view of the mould of FIG. 7.

The mould which is used in the manufacture of the claimed animal bed is shown in FIGS. 7 and 8. The clamping nuts shown are only illustrative. Larger production runs are naturally automated, so that the closing and opening of the mould lid is effected by means of a non-illustrated hydraulic or pneumatic device.

EXAMPLE

Chemical components were mixed in a mixer. In one of the production runs, a flexible molding foam was used which is commercially available under the trademark FLEXIPOL manufactured by the Flexipol corporation. A first component, an isocyanate, and a second component, a polyol blend, were mixed to form a foamable base mixture. Once fully mixed, the foamable base was poured into the mould which, as mentioned above, was an epoxy-lined fiberglass form. The foamable base was allowed to rise for three minutes and to cure for another two minutes. The end product was a very sturdy polyurethane bed.

Quite important in this context was the "skin" which had formed on the walls. The structure was impermeable to liquids, it was water-tight and thus easily washable. Also, the walls do not soak up any of the animal body odors and fluids.

I claim:

1. In a method of manufacturing a bed for domestic animals having a basic structure with a bottom wall and side walls, the improvement which comprises:
   mixing chemical components for forming a foamable base;
   placing the foamable base in a mould having a shape of an animal bed;
   curing the foamable base for forming a one-piece integral foam bed structure having a liquid impermeable closed pore skin integrally formed thereon; and
   removing the foam bed structure from the mould.

2. The method according to claim 1, which comprises covering the basic structure with a cover fabric after the removing step.

3. A bed for domestic animals, comprising a foamed basic structure formed in a single mould, said basic structure having a bottom wall and side walls integrally formed on said bottom wall, said side walls defining an obtuse angle with said bottom wall, and said walls having a closed-cell liquid-impermeable skin integrally formed thereon at least on inside surfaces of said basic structure.

4. The animal bed according to claim 3, wherein said basic structure has exposed surfaces and said liquid-impermeable skin is integrally formed on all of said exposed surfaces of said basic structure.

5. The animal bed according to claim 3, wherein said obtuse angle lies in a range between 120° and 100°.

6. The animal bed according to claim 5, wherein said obtuse angle is approximately 110°.

* * * * *